(12) United States Patent
Hu et al.

(10) Patent No.: US 11,556,191 B2
(45) Date of Patent: Jan. 17, 2023

(54) CONTROL METHOD FOR PORTABLE READ-WRITE PEN AND PORTABLE READ-WRITE PEN

(71) Applicant: MPEN TECHNOLOGY (SHENZHEN) CO., LTD, Guangdong (CN)

(72) Inventors: Feng Hu, Guangdong (CN); Zhen Zhang, Guangdong (CN); Dagang Zhang, Guangdong (CN)

(73) Assignee: MPEN TECHNOLOGY (SHENZHEN) CO., LTD, Shenzhen (CN)

( * ) Notice: Subject to any disclaimer, the term of this patent is extended or adjusted under 35 U.S.C. 154(b) by 307 days.

(21) Appl. No.: 16/981,686

(22) PCT Filed: Nov. 16, 2018

(86) PCT No.: PCT/CN2018/115942
§ 371 (c)(1),
(2) Date: Sep. 16, 2020

(87) PCT Pub. No.: WO2019/174291
PCT Pub. Date: Sep. 19, 2019

(65) Prior Publication Data
US 2021/0004090 A1    Jan. 7, 2021

(30) Foreign Application Priority Data
Mar. 16, 2018   (CN) .......................... 201810216609.0

(51) Int. Cl.
G06F 3/038      (2013.01)
G06F 3/03       (2006.01)
(Continued)

(52) U.S. Cl.
CPC .............. *G06F 3/038* (2013.01); *B43K 23/12* (2013.01); *B43K 29/08* (2013.01); *G06F 3/0317* (2013.01); *G06F 3/03545* (2013.01)

(58) Field of Classification Search
CPC .... G06F 3/038; G06F 3/0317; G06F 3/03545; B43K 23/12; B43K 29/00; B43K 29/08;
(Continued)

(56) References Cited

U.S. PATENT DOCUMENTS

| | | | |
|---|---|---|---|
| 6,627,870 B1 * | 9/2003 | Lapstun | G01C 21/3623 250/221 |
| 7,785,027 B1 * | 8/2010 | McKinley | B43K 29/08 401/32 |
| 8,978,487 B2 * | 3/2015 | Fergusson | G06F 3/0447 73/862.626 |

FOREIGN PATENT DOCUMENTS

| | | |
|---|---|---|
| CN | 103680229 A | 3/2014 |
| CN | 107316506 A | 11/2017 |

(Continued)

OTHER PUBLICATIONS

International Search Report of PCT Patent Application No. PCT/CN2018/115942 dated Jan. 30, 2019.

*Primary Examiner* — David J Walczak

(57) ABSTRACT

A portable read-write pen and a control method for a portable read-write pen. The control method for a portable read-write pen includes the following steps: step S1 of detecting a state of a pen point of the portable read-write pen; and step S2 of controlling, according to the state of the pen point of the portable read-write pen, the portable read-write pen to enable a touch-read mode or a write-record mode.

20 Claims, 4 Drawing Sheets

Detect a state of a pen point of a portable read-write pen — S1

Control, according to the state of the pen point of the portable read-write pen, the portable read-write pen to enable a touch-read mode or a write-record mode — S2

(51) Int. Cl.
    *G06F 3/0354*     (2013.01)
    *B43K 23/12*     (2006.01)
    *B43K 29/08*     (2006.01)

(58) Field of Classification Search
    CPC ........ B43K 27/00; B43K 27/02; B43K 27/04; B43K 27/08
    USPC .................................................... 401/29–33
    See application file for complete search history.

(56) References Cited

FOREIGN PATENT DOCUMENTS

| | | |
|---|---|---|
| CN | 206975613 U | 2/2018 |
| CN | 207052109 U | 2/2018 |

\* cited by examiner

CONTROL METHOD FOR PORTABLE READ-WRITE PEN AND PORTABLE READ-WRITE PEN

FIELD OF THE INVENTION

The present disclosure relates to the field of read-write devices, and in particular, to a control method for a portable read-write pen and a portable read-write pen.

BACKGROUND OF THE INVENTION

An existing write-record pen needs to be used together with special paper printed with position information. The write-record principle is as follows: (1) position coordinates are laid on the paper; and (2) the write-record pen captures respective position coordinates of a moving trace of a pen point, and reproduces a writing trace of the pen point according to the position coordinates.

An existing touch-read pen needs to be used together with a specially printed book. The touch-read principle is as follows: (1) a layer of charcoal black "base code" that is almost invisible to naked eyes is printed on the book during color separation printing; (2) the base code is formed by evenly arranged small blocks having various "patterns", and the "patterns" of the small blocks are different for different sounding positions, each of the "patterns" having a unique "serial number"; (3) when the touch-read pen "touches-reads" different positions, a microscope camera within the pen captures an image of a touched-read position, and colors including red, green and blue are removed by means of the infrared color filtration technology, so that only a pattern of the charcoal black "base code" is left in the captured image; (4) the captured charcoal black "pattern" is identified so as to obtain a "serial number" of the captured "pattern"; and (5) the obtained "serial number" is used to retrieve a composite electronic file pre-stored in the touch-read pen, and audio data corresponding to the "serial number" is found and played.

In existing technologies, there is no single device which can realize both a touch-read function and a write-record function and can be conveniently switched between the touch-read function and the write-record function.

SUMMARY OF THE INVENTION

The main objective of the present application is to provide a control method for a portable read-write pen so as to conveniently switch between a touch-read function and a write-record function.

In order to achieve the above objective, the present application provides a control method for a portable read-write pen, the portable read-write pen having a touch-read mode and a write-record mode, wherein the control method for a portable read-write pen includes the following steps: step S1 of detecting a state of a pen point of the portable read-write pen; and step S2 of controlling, according to the state of the pen point of the portable read-write pen, the portable read-write pen to enable the touch-read mode or the write-record mode.

In an embodiment, the step S1 includes: step S11 of detecting an exposed stated of the pen point of the portable read-write pen; and the step S2 includes: step S21 of determining whether the pen point of the portable read-write pen protrudes from a pen head, wherein if yes, the portable read-write pen is controlled to enable the write-record mode; and if no, the portable read-write pen is controlled to enable the touch-read mode.

In an embodiment, after the step S11, the control method further includes: step S12 of further detecting a pressure state of the pen point of the portable read-write pen; and the step S2 further includes: step S22 of determining whether a pressure on the pen point of the portable read-write pen is larger than a pre-set pressure threshold, wherein if yes, the portable read-write pen is controlled to enable the write-record mode; and if no, the portable read-write pen is controlled to enable the touch-read mode.

In an embodiment, after the step S11, the control method further includes: step S13 of further detecting a moving distance of the pen point of the portable read-write pen within a pre-set time length; and the step S2 further includes: step S23 of determining whether the moving distance within the pre-set time length is larger than a pre-set moving distance threshold, wherein if yes, the portable read-write pen is controlled to enable the write-record mode; and if no, the portable read-write pen is controlled to enable the touch-read mode.

In an embodiment, prior to the step S2, the control method further includes: step S3 of acquiring an image of a printed matter, identifying a type of a dot matrix code, and controlling, according to the type of the dot matrix code, the portable read-write pen to enable the touch-read mode or the write-record mode.

In an embodiment, a process of enabling the touch-read mode includes steps of: analyzing the image of the printed matter and calculating a position coordinate according to an analyzed result; determining, according to the position coordinate, a hotspot; and searching, according to the hotspot, a corresponding touch-read resource.

In an embodiment, the control method for a portable read-write pen further includes: detecting a motion state of the portable read-write pen; and controlling, according to the motion state of the portable read-write pen, the portable read-write pen to enable the touch-read mode or the write-record mode.

The present application further provides a portable read-write pen, wherein the portable read-write pen has a touch-read mode and a write-record mode, and the portable read-write pen includes: a memory, a processor and a computer program that is stored on the memory and can be run on the processor, wherein the computer program, when executed by the processor, implements steps of a control method for the portable read-write pen, the control method for the portable read-write pen including the following steps: step S1 of detecting a state of a pen point of the portable read-write pen; and step S2 of controlling, according to the state of the pen point of the portable read-write pen, the portable read-write pen to enable the touch-read mode or the write-record mode.

In an embodiment, the portable read-write pen further includes a pen cap which is detachably connected with a pen head of the portable read-write pen to enclose a pen point, wherein when the pen cap encloses the pen point, the portable read-write pen enables the touch-read mode; and when the pen cap is separated from the pen head, the portable read-write pen enables the write-record mode or the touch-read mode.

By using the control method for a portable read-write pen provided by the present application, a state of a pen point of the portable read-write pen can be detected, and the portable read-write pen can be controlled to enable a touch-read mode or a write-record mode according to the state of the pen point. In this way, by using the control method, it can be determined whether the portable read-write pen is in the touch-read mode or the write-record mode according to different usage scenarios, so that the portable read-write pen can be switched to the touch-read mode or the write-record mode in a corresponding usage scenario, thereby providing usage convenience to a user.

BRIEF DESCRIPTION OF THE DRAWINGS

In order to illustrate technical solutions in embodiments of the present application or in existing technologies more clearly, a brief introduction will be made below to drawings used in description of the embodiments or the existing technologies. Obviously, the drawings in the following description only involve some embodiments of the present application, and those ordinary skilled in the art may also obtain other drawings based on structures shown in these drawings without making any creative effort.

LIST OF REFERENCE NUMBERS

Figure 1:
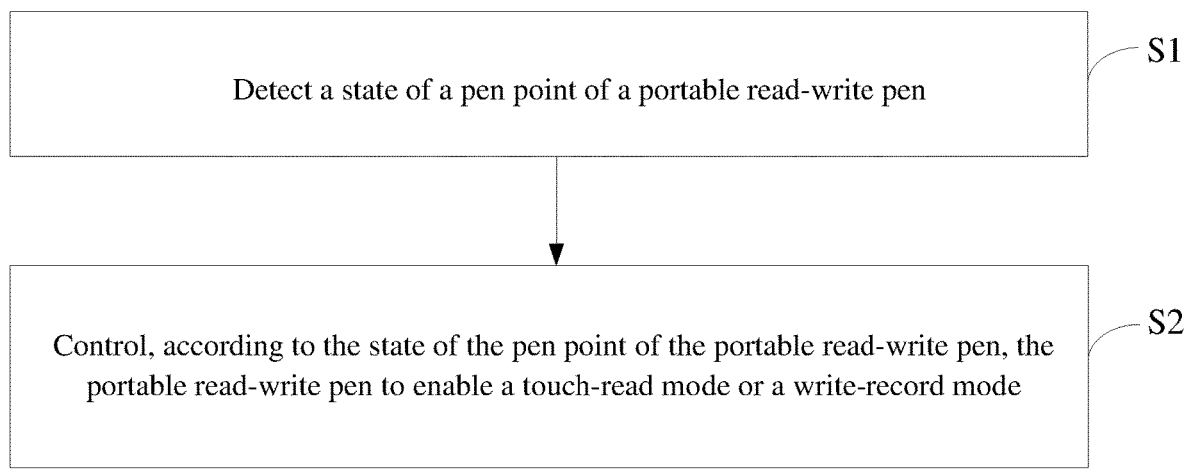
FIG. 1 schematically show steps in an embodiment of a control method for a portable read-write pen according to the present application.

Realization of the objective, functional features and advantages of the present application with the embodiments will be further described with reference to the drawings.

DETAILED DESCRIPTION OF THE EMBODIMENTS

Technical solutions in embodiments of the present application will be described clearly and completely with reference to drawings in the embodiments of the present application. Obviously, the embodiments described are only some embodiments of the present application, rather than all embodiments thereof. All other embodiments obtained by those ordinary skilled in the art based on the embodiments in the present application without making any creative effort shall fall within the protection scope of the present application.

It should be noted that if there is a directional indication (such as up, down, left, right, front, back . . . ) in the embodiments of the present application, the directional indication is only used to explain a relationship of relative positions of respective components and movements thereof under a specific situation (as shown in the drawings); and if this specific situation is changed, the directional indication is changed correspondingly.

Besides, if there is description involving wordings of "first", "second" and so on in the embodiments of the present application, the description involving wordings of "first", "second" and so on is only for the purpose of illustration and cannot be understood as indicating or implying relative importance or implicitly indicating the number of the indicated technical features. Accordingly, a feature limited by "first" or "second" may indicate or imply that the number of the feature included is at least one. In addition, technical solutions of respective embodiments may be combined with each other, but a combination of technical solutions must be realizable by those ordinary skilled in the art; and when a combination of technical solutions contains a contradiction or are not realizable, it should be considered that this combination of technical solutions does not exist and does not fall within the protection scope of the present application.

The present application provides a control method for a portable read-write pen. The portable read-write pen has both a touch-read mode and a write-record mode. By using this control method, the portable read-write pen can be controlled to automatically switch between a touch-read mode and a write-record mode according to a state of a pen point of the portable read-write pen.

The control method for a portable read-write pen provided according to embodiments of the present application and a portable read-write pen for adopting the control method are described hereinafter with reference to the drawings.

First, the control method for a portable read-write pen is described. As shown in FIG. 1, the control method includes the following steps.

At step S1, a state of a pen point of the portable read-write pen is detected. Specifically, the state of the pen point includes an exposed state of the pen point, a pressure state of the pen point, a movement trace state of the pen point, and so on.

At step S2, the portable read-write pen is controlled to enable a touch-read mode or a write-record mode according to the state of the pen point of the portable read-write pen. Since a state of the pen point when the portable read-write pen is used for touching-reading is different from a state of the pen point when the portable read-write pen is used for writing-recording, the portable read-write pen can be controlled to enable the touch-read mode or the write-record mode according to the state of the pen point.

Since the control method for a portable read-write pen provided by the present application can be used to control the portable read-write pen to enable the touch-read mode or the write-record mode according to the state of the pen point of the read-write pen, the control method can be used to determine whether the portable read-write pen is in the touch-read mode or the write-record mode according to different usage scenarios, so that the portable read-write pen can be switched to the touch-read mode or the write-record mode in a corresponding usage scenario, thereby providing usage convenience to a user.

Figure 2:
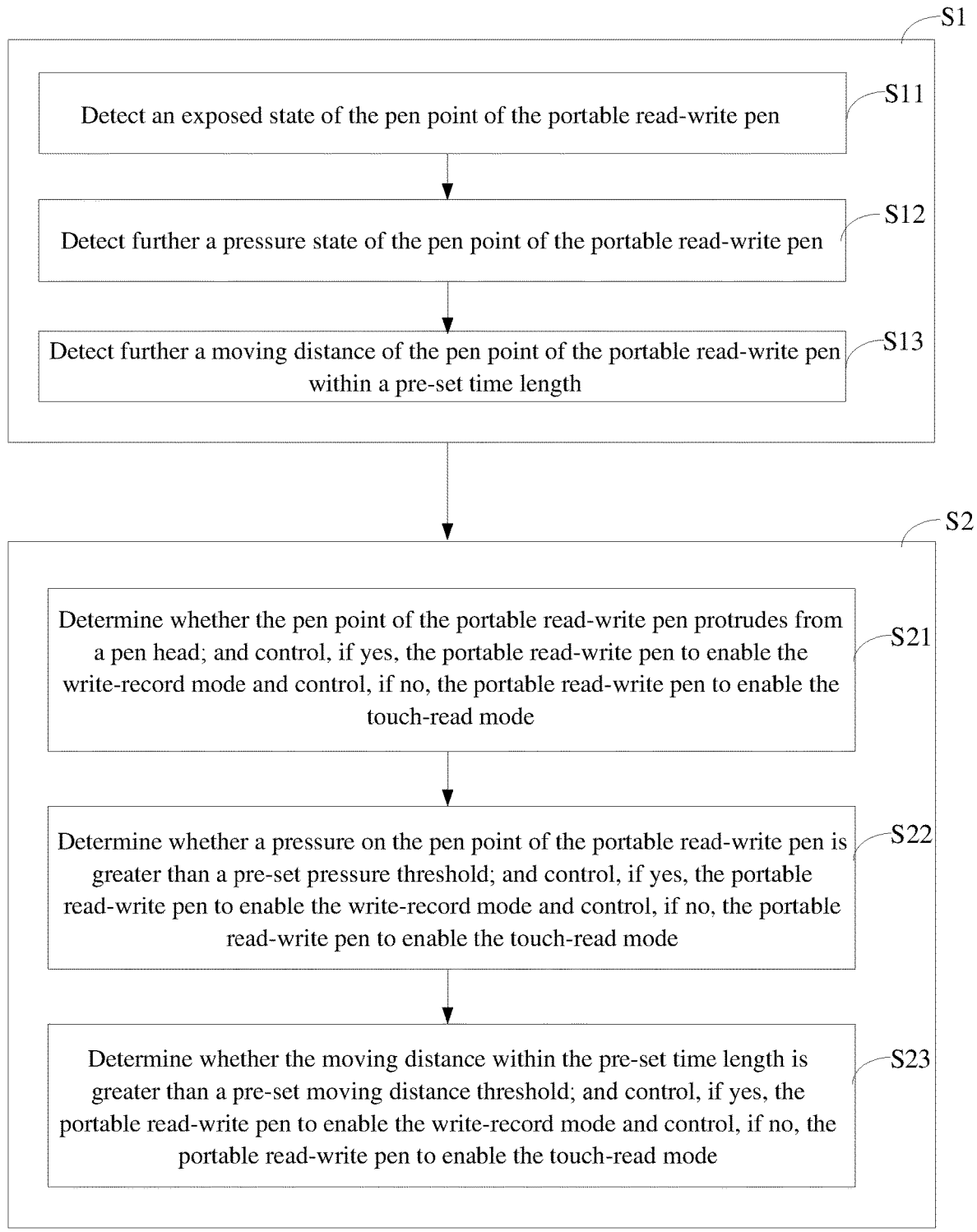
FIG. 2 schematically shows detailed steps of the control method for a portable read-write pen in FIG. 1.

Further, referring to FIG. 2, the state of the pen point includes the exposed state of the pen point. The step S1 includes step S11. At the step S11, the exposed state of the pen point of the portable read-write pen is detected. The step S2 includes step S21. At the step S21, it is determined whether the pen point of the portable read-write pen protrudes from a pen head. If yes, the portable read-write pen is controlled to enable the write-record mode; and if no, the portable read-write pen is controlled to enable the touch-read mode.

Specifically, the exposed state of the pen point may be changed by putting on a pen cap or taking off the pen cap. The pen head is provided thereon with a control switch to be triggered by the pen cap. When the pen cap encloses the pen point, the control switch controls the portable read-write pen to enable the touch-read mode; and when the pen cap is separated from the pen point, the control switch controls the portable read-write pen to enable the write-record mode, or whether to enable the touch-read mode or the write-record mode may be determined again according to the method described in other parts.

However, the design of the present disclosure is not limited thereto. In other embodiments, the pen point is configured to be movably connected with the pen head, so that the pen point may be received in or protrude from the pen head. Specifically, the pen point may be configured to be a telescopic structure, a thread connection structure, or a foldable structure. In this way, when the pen point is received in the pen head, the portable read-write pen enables the touch-read mode; and when the pen point protrudes from the pen head, the portable read-write pen enables the write-record mode.

Further, still referring to FIG. 2, the state of the pen point further includes the pressure state of the pen point. Step S12 is further included after the step S11. At the step S12, the pressure state of the pen point of the portable read-write pen is further detected. The step S2 further includes step S22. At the step S22, it is determined whether a pressure on the pen point of the portable read-write pen is greater than a pre-set pressure threshold. If yes, the portable read-write pen is controlled to enable the write-record mode; and if no, the portable read-write pen is controlled to enable the touch-read mode.

Specifically, when a touch-read function is used, the pen point of the portable read-write pen usually lightly touches a touch-read book, and thus a pressure on the pen point is less; and when a write-record function is used, a pressure between the pen point of the portable read-write pen and a notebook is greater. Therefore, the portable read-write pen may be controlled to enable the touch-read mode or the write-record mode by detecting the pressure state of the pen point of the portable read-write pen.

Herein, it should be noted that, for the hardware design, the pen point cannot distinguish a magnitude of the pressure, but can only detect whether the pen point is pressed down. That is, the pressure state includes a zero pressure and a maximum pressure, which may be used to control switching on or off of a mode. In addition, a distance by which the pen point is presses down may be converted into a corresponding pressure value. Generally speaking, the greater the distance by which the pen point is presses down is, the greater the pressure is.

Considering that in some cases, a user still hopes to run the touch-read mode even if the pen point is in the exposed state, in the control method for a portable read-write pen provided by the present disclosure, the pressure state of the pen point is further detected after the exposed state of the pen point is detected. In this way, the portable read-write pen enables the write-record mode only when a requirement that the pen point is in the exposed state and a requirement that the pen point and a printed matter have a certain pressure therebetween are both met, so that precision of controlling an operating mode of the portable read-write pen can be further improved.

Further, still referring to FIG. 2, the state of the pen point further includes a movement state of the pen point within a pre-set time length. Step S13 is further included after the step S11. At the step S13, a moving distance of the pen point of portable read-write pen within a pre-set time length is further detected. The step S2 further includes step S23. At the step S23, it is determined whether the moving distance within the pre-set time length is greater than a pre-set moving distance threshold. If yes, the portable read-write pen is controlled to enable the write-record mode; and if no, the portable read-write pen is controlled to enable the touch-read mode.

Specifically, when a touch-read mode is used, a movement trace of the pen point is usually short; and when a write-record mode is used, a movement trace of the pen point is usually long. Accordingly, the portable read-write pen may be controlled to enable the touch-read mode or the write-record mode by detecting the moving distance of the pen point of the portable read-write pen within the pre-set time length.

The moving distance of the pen point within the pre-set time length is further detected after the exposed state and the pressure state of the pen point are detected in the control method for a portable read-write pen provided by the present disclosure. Accordingly, when the pen point is in the exposed state and the pressure on the pen point is greater than the pre-set pressure threshold, it is required to further detect the moving distance of the pen point within the pre-set time length. In this way, even if the pen point is in the exposed state and the pressure on the pen point is greater than the pre-set pressure threshold, if the pen point does not move or a moving distance of the pen point is too short within a pre-set time length, the portable read-write pen still enables the touch-read mode and does not enable the write-record mode, so that the precision of controlling an operating mode of the portable read-write pen can be further improved.

Herein, it should be noted that, in the present embodiment, the step S13 is after the step S12. That is, the pressure state of the pen point of the portable read-write pen is firstly detected, and then the moving distance of the pen point of the portable read-write pen within the pre-set time length is detected. However, the design of the present disclosure is not limited thereto. In other embodiments, the step S13 may be prior to the step S12, or the step S13 and the step S12 are performed respectively. In other words, the step S12 of detecting the pressure state of the pen point and the step S13 of detecting the moving distance of the pen point may be combined with each other or may be enabled respectively, and there is no strict time sequence relationship therebetween.

More importantly, the step S13 and the step S12 may influence each other. When the pressure on the pen point is less, the portable read-write pen still enables the touch-read mode even if the pen point is displaced to a certain extent; and when the pressure on the pen point is greater, the portable read-write pen enters into the write-record mode as along as the pen point is slightly displaced.

Figure 3:
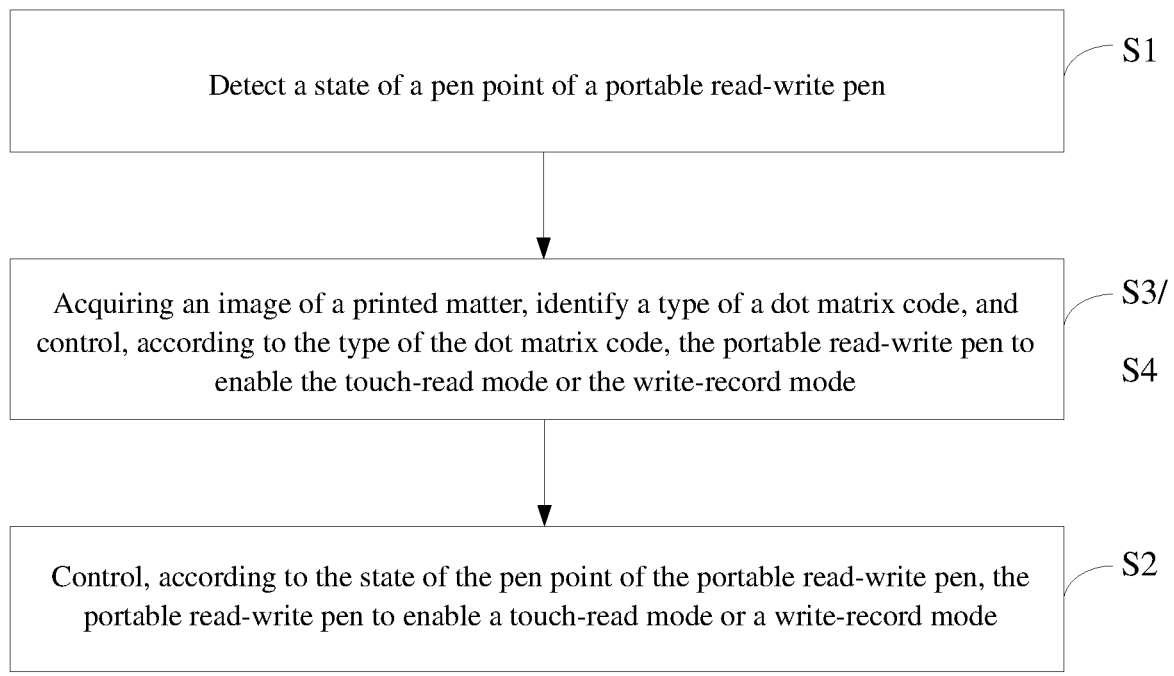
FIG. 3 schematically show steps in another embodiment of the control method for a portable read-write pen according to the present application.

Further, referring to FIG. 3, step S3 and step S4 are further included prior to the step S2. At the step S3, an image of a printed matter is acquired, and a type of a dot matrix code is identified. At the step S4, the portable read-write pen is controlled to enable the touch-read mode and/or the write-record mode according to the type of the dot matrix code.

Specifically, in existing applications, different dot matrix codes are used for different scenarios. Some dot matrix codes are used for touching-reading (for example, Sonix second-generation code) only; some dot matrix codes are usually used for writing-recording (a common position coordinate) only; and some codes may be used for different scenarios (for example, a combination of the position coordinate and a hotspot as provided in the present disclosure). When the portable read-write pen identifies a dot matrix code that is used for touching-reading only, the portable read-write pen enables the touch-read mode; and when the portable read-write pen identifies a dot matrix code that is used for writing-recording only, the portable read-write pen enables the write-record mode. Therefore, a process of determining the operating mode of the portable read-write pen can be simplified.

Further, when the portable read-write pen identifies that the position coordinate and the hotspot are both included in the image of the printed matter, the portable read-write pen determines to enable the touch-read mode or the write-record mode according to the above control method.

Now, a process of enabling the write-record mode and a process of enabling the touch-read mode by using the control method for a portable read-write pen provided in the present disclosure are described. (1) The process of enabling the write-record mode includes steps of: analyzing the image of the printed matter and calculating a position coordinate according to an analyzed result; continuously recording position coordinates; and generating a writing trace according to the position coordinates. (2) The process of enabling the touch-read mode includes steps of: analyzing the image of the printed matter and calculating a position coordinate according to an analyzed result; determining a hotspot according to the position coordinate; and searching a corresponding touch-read resource according to the hotspot.

Specifically, each of different touch-read areas is described as a "hotspot". The hotspot includes description of a specific position and a shape of this area. The shape may be described with a specific polygon or a combination of a series of basic shapes (a triangle, a rectangle, a square, a circle and so so). Using a combination of basic shapes to describe the shape has two main advantages: one advantage is that it is convenient to simulate any shape; and another advantage is that it can be quickly found out whether a coordinate is located within a basic shape. For example, the hotspot has a shape of an apple, and the shape may be approximately simulated by using a series of rectangles superposing. A specific touch-read operation may include: an audio for sounding, a special touch-read operation (for example, performing control to turn up or down the volume), text description for an associated sound, whether there is an associated video or a possible URL of the video, and so on. Each hotspot may correspond to an associated touch-read operation. The hotspot containing the position of the pen point can be searched according to the position of the pen point, and further the corresponding touch-read operation is founded and enabled.

The existing touch-read pen indexes touch-read resources in the hotspot by scanning the Sonix second-generation code, and accordingly the touch-read pen needs to be used together with a printed matter printed with code values so as to perform touching-reading. The existing write-record pen generates the writing trace by scanning the position coordinate, and accordingly the write-record pen needs to be used together with a printed matter printed with position coordinates so as to performing writing-recording. For the portable touch-read pen provided in the present disclosure, the touch-read function is improved as indexing touch-read resources in the hotspot by scanning the position coordinate. In this way, touching-reading and writing-recording can be performed on the same printed matter, for example, special paper printed with position coordinates and hotspots.

Further, the control method of the portable read-write pen further includes: detecting a motion state of the portable read-write pen; and controlling the portable read-write pen to enable the touch-read mode and the write-record mode according to the motion state of the portable read-write pen.

Specifically, the portable read-write pen is provided thereon with a sensor that may sense the motion state, for example, a gyroscope. In this way, when the gyroscope detects a certain action, the operating mode of the portable read-write pen may be controlled according to a pre-set program. For example, when the pen head of the portable read-write pen moves on the printed matter in a ticking or crossing manner, the portable read-write pen enables the touch-read mode and responds to an action of ticking or crossing; or when the gyroscope detects that the portable read-write pen is rotating, the portable read-write pen enables the write-record mode.

In addition, when the gyroscope detects a certain action, the portable read-write pen may further be controlled to enable other operations according to a pre-set program. For example, when the portable read-write pen is raised, an action of turning off the camera may be enabled, so as to achieve the effect of saving power.

The present disclosure further discloses a portable read-write pen. The portable read-write pen has a touch-read mode and a write-record mode. The portable read-write pen includes: a memory, a processor and a computer program that is stored on the memory and can run on the processor. The computer program, when executed by the processor, implements steps of the method in the above embodiments.

Those ordinary skilled in the art should understand that the above memory stores executable instructions, and the above processor enables the executable instructions to implement the method recited in the above various embodiments. Those ordinary skilled in the art should further understand that various software modules or software units may be inherently stored on the memory and be executed by the processor.

Specifically, the portable read-write pen includes a pen body, a pen head and a pen point. The pen body is provided therein with the memory and the processor, and the pen body is further provided therein with a Bluetooth module or a WiFi module to realize networking or connection with a smart terminal such as a tablet computer and a mobile phone. The pen point may be used to write, and is provided thereon with a pressure sensor. The pen point or the pen head is provided thereon with a high-speed macro camera to capture a position coordinate on the printed matter.

Further, the portable read-write pen further includes a pen cap. The pen cap is detachably connected with the pen head of the portable read-write pen to enclose the pen point. When the pen cap encloses the pen point, the portable read-write pen enables the touch-read mode; and when the pen cap is separated from the pen head, the portable read-write pen enables the write-record mode or may determine again whether to enable the touch-read mode or the write-record mode according to the method described in other parts. Specifically, the pen cap may enclose the pen point, and the pen cap is provided thereon with a hole, so as to ensure that the high-speed macro camera can still normally capture the position coordinate on the printed matter when the pen cap covers the pen head, thereby realizing normal operating of the touch-read mode.

Further, in order to avoid that the pen point leaves ink on the printed matter when the touch-read mode is used, in an embodiment of the present disclosure, the pen point of the portable read-write pen is configured to be in an ink discharging state when a pressure on the pen point is greater than a pre-set pressure threshold. Specifically, the pre-set pressure threshold is the same as a pre-set pressure threshold when the portable read-write pen switches between the touch-read mode and the write-record mode. In this way, the pen point is in the ink-discharging state only when the portable read-write pen is in the write-record mode; and when the portable read-write pen is in the touch-read mode, the pen point does not discharge ink and thus does not leave a writing trace on the printed matter.

However, the design of the present disclosure is not limited thereto. In other embodiments, the pen point includes a dedicated pen point for the touch-read mode and a dedicated pen point for the write-record mode. The pen point is detachable from the pen head. When the dedicated pen point for the touch-read mode is mounted, the dedicated pen point for the touch-read mode may trigger the portable read-write pen to enable the touch-read mode, and when the dedicated pen point for the write-record mode is used, the dedicated pen point for the write-record mode may trigger the portable read-write pen to enable the write-record mode.

Further, the portable read-write pen provided in the present disclosure may further include two tendency operating modes. Specifically, a touch-read tendency mode and a write-record tendency mode are included. When the portable read-write pen runs the write-record tendency mode, a standard for the portable read-write pen to enter into the write-record mode is lowered. Specifically, the pre-set pressure threshold and/or a pre-set moving distance threshold are/is decreased. In this way, the portable read-write pen can enter into the write-record mode when a pressure on the pen point is less or when a moving distance of the pen point is shorter, and thus the portable read-write pen is very suitable for a user who often uses the write-record mode. Likewise, when the portable read-write pen runs the touch-read tendency mode, a standard for the portable read-write pen to enter into the touch-read mode is lowered, and thus the portable read-write pen is very suitable for a user who often uses the touch-read mode. The specific principle is similar to the principle for running the write-record mode, and will not be repeated.

In order to facilitate understanding, an example of operating scenarios of the portable read-write pen is provided.

In an embodiment of the present disclosure, a working state of the portable read-write pen can be controlled by means of movement of the pen point only. For example, if the moving distance of the pen point in 100 milliseconds is greater than a pre-set moving distance threshold, the portable read-write pen is controlled to enable the write-record mode; and if the moving distance of the pen point in 100 milliseconds is less than or equal to the pre-set moving distance threshold, the portable read-write pen is controlled to enable the touch-read mode.

In another embodiment of the present disclosure, a function of user configuration is added for the portable read-write pen. In this way, configurations can be made according to the usage habit of the user. For example, if the user often uses the touch-read mode, the user can configure the portable read-write pen to operate in the touch-read tendency mode. At this time, the standard for the portable read-write pen to enter into the touch-read mode is lowered, and thus the portable read-write pen still runs the touch-read mode if the moving distance of the pen point in 100 milliseconds is greater than the pre-set moving distance threshold.

In another embodiment of the present disclosure, the portable read-write pen further has a learning function. Specifically, the portable read-write pen may record the usage habit of the user during a period of time and analyze the user's preference according to the usage habit of the user. In this way, the touch-read pen can be configured to operate in the touch-read tendency mode or in the write-record mode.

Herein, it should be noted that, in the present disclosure, the working state of the portable read-write pen can be controlled not only by one of the exposed state of the pen point, the pressure state of the pen point, a moving distance state of the pen point, user configuration and usage habit of the user but also by a combination of the above parameters. In this way, the precision of controlling an operating mode can be further improved, and it is convenient for the user to use.

Figure 4:
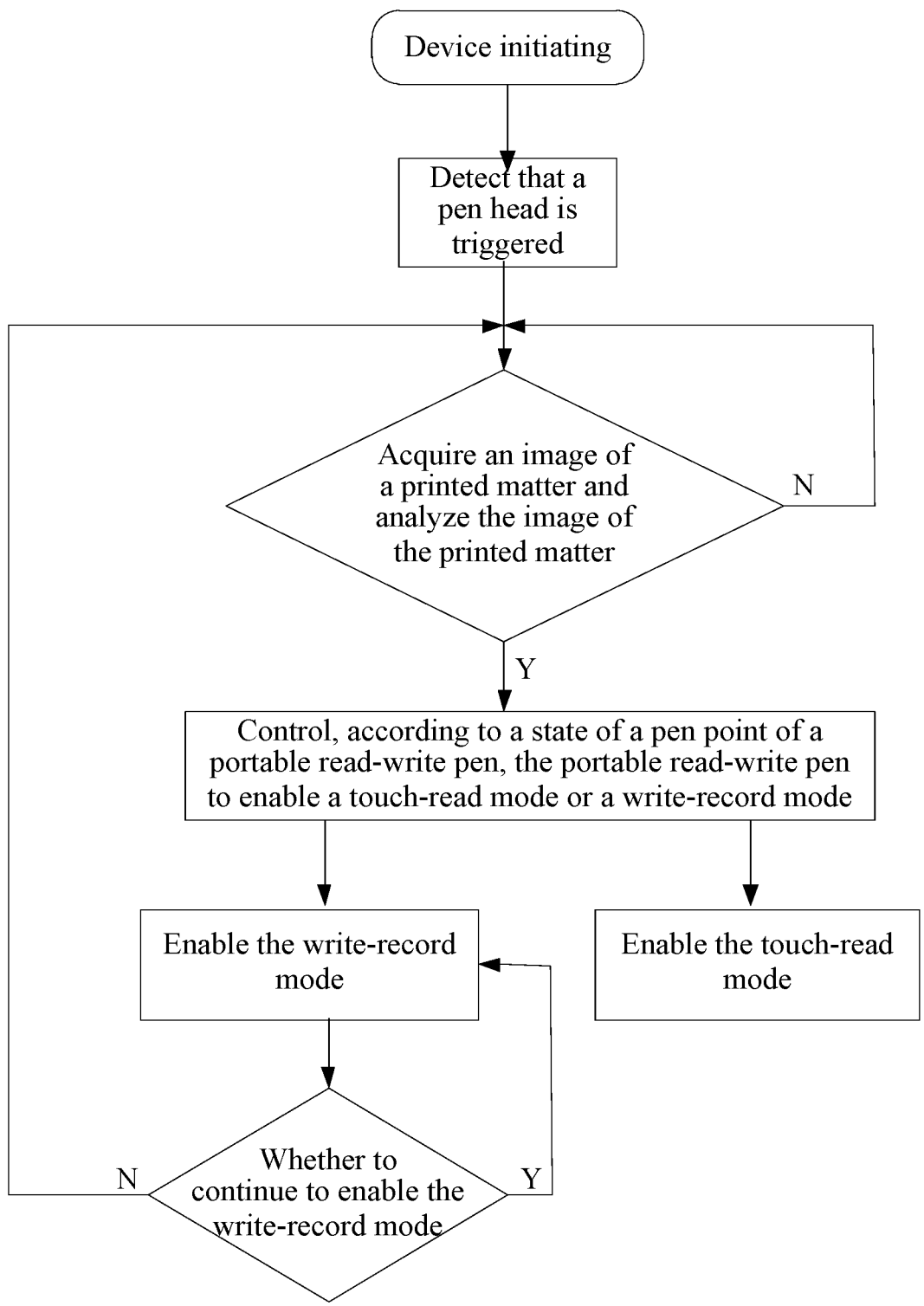
FIG. 4 shows a flowchart in an embodiment of the control method for a portable read-write pen according to the present application.

Now, a working process of the portable read-write pen provided in the present disclosure is described with reference to FIG. 4. First, the portable read-write pen starts up and initiates. At this time, the portable read-write pen can enable respective basic functions, for example, adjusting the volume, transmitting data to an associated connection device, performing networking to check for software updates, and so on.

Then, it is detected whether the pen head is triggered. When it is detected that the pen head is triggered, the high-speed macro camera acquires an image of a printed matter and decodes the image. If decoding fails, the high-speed macro camera waits or processes a subsequent image acquired; and if decoding succeeds, it is determined whether the write-record function is supported according to a type of a dot matrix and a code value. For the dot matrix that does not support the write-record function (for example, an existing touch-read book), this device enters into the touch-read mode. For the dot matrix that supports the write-record function (for example, a printed matter printed with position coordinates corresponding to touch-read resources), it is required to determine whether the portable read-write pen should enable the touch-read mode or enable the write-record mode, and the specific process of determining is as described in the above various embodiments and will not be repeated herein.

At last, if the portable read-write pen enters into the touch-read mode, associated touch-read operations are performed. (1) If a dot matrix identification code is a code value that only supports touching-reading (which is normally an integer), for example, the Sonix second-generation code and the MPR code, a corresponding audio file may be found by means of a code value correspondence table to perform sounding or other actions (for example, inputting letters of a word). (2) If the dot matrix identification code is the above position coordinate, the corresponding audio file in associated resources of the printed matter may be found by the hotspot defined by the position coordinate. Definition of the hotspot and operations are as follows.

i. A hotspot specially refers to an area within one page of a printed matter. The area may be similar to various shapes (for example, a rectangle, a circle, a shape of an object such as a cat). A shape of the area may be simulated by superposing of a series of basic shapes (a triangle, a rectangle, a circle, and so on). Using a combination of basic shapes to describe the shape has two main advantages: one advantage is that it is convenient to simulate any shape; and another advantage is that it can be quickly found out whether a coordinate is located within a basic shape.

ii. Meanwhile, each hotspot has one or more corresponding touch-read action definitions, for example, a corresponding audio file for sounding, a corresponding description of playing a video, a corresponding literal description, a corresponding special operation (for example, turning up or down the volume of the device), and so on.

iii. With a specific position coordinate, it can be determined whether there is a hotspot contains this specific position coordinate; and if yes, a touch-read sounding or operation corresponding to this hotspot may be found.

If the portable read-write pen enters into the write-record mode, the current position coordinate is recorded, and images are acquired and analyzed continuously to calculate and keep specific position coordinates until triggering of the pen head is eliminated.

The above description only involves preferred embodiments of the present application, and does not limit the patent scope of the present application. Equivalent structural transformations made based on the description and drawings of the present application under the inventive idea of the present application or direct/indirect applications to other associated technical fields fall into the patent protection scope of the present application.

The invention claimed is:

1. A control method for a portable read-write pen, the portable read-write pen having a touch-read mode and a write-record mode, characterized in that, the portable read-write pen is controlled to automatically switch between the touch-read mode and the write-record mode based on a pressure state of a pen point of the portable read-write pen, and the pen point may be received in or protrude from a pen head, wherein the control method for a portable read-write pen comprises following steps:

step S1 of detecting a state of the pen point of the portable read-write pen; and step S2 of controlling, according to the state of the pen point of the portable read-write pen, the portable read-write pen to enable the touch-read mode or the write-record mode, wherein detecting a state of the pen point of the portable read-write pen specifically comprises step S12 of:

detecting a pressure state of the pen point of the portable read-write pen; and wherein controlling, according to the state of the pen point of the portable read-write pen, the portable read-write pen to enable the touch-read mode or the write-record mode specifically comprises step S22 of:

determining whether a pressure on the pen point of the portable read-write pen is greater than a pre-set pressure threshold, wherein if yes, the portable read-write pen is controlled to enable the write-record mode; and if no, the portable read-write pen is controlled to enable the touch-read mode.

2. The control method for a portable read-write pen according to claim 1, characterized in that, prior to the step S12, the control method further comprises step S11 of detecting an exposed state of the pen point of the portable read-write pen; and the step S2 further comprises:

step S21 of determining whether the pen point of the portable read-write pen protrudes from the pen head, wherein if yes, the portable read-write pen is controlled to enable the write-record mode or the touch-read mode according to the step S22; and if no, the portable read-write pen is controlled to enable the touch-read mode.

3. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 2.

4. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 2.

5. The control method for a portable read-write pen according to claim 2, characterized in that, after the step S12, the control method further comprises:

step S13 of further detecting a moving distance of the pen point of the portable read-write pen within a pre-set time length; and the step S2 further comprises:

step S23 of determining whether the moving distance within the pre-set time length is larger than a pre-set moving distance threshold, wherein if yes, the portable read-write pen is controlled to enable the write-record mode; and if no, the portable read-write pen is controlled to enable the touch-read mode.

6. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 5.

7. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 5.

8. The control method for a portable read-write pen according to claim 1, characterized in that, prior to the step S2, the control method further comprises:

step S3 of acquiring an image of a printed matter, identifying a type of a dot matrix code, and controlling, according to the type of the dot matrix code, the portable read-write pen to enable the touch-read mode or the write-record mode.

9. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 8.

10. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 8.

11. The control method for a portable read-write pen according to claim 8, characterized in that, a process of enabling the touch-read mode comprises steps of:
- analyzing the image of the printed matter and calculating a position coordinate according to an analyzed result;
- determining, according to the position coordinate, a hotspot; and
- searching, according to the hotspot, a corresponding touch-read resource.

12. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 11.

13. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 11.

14. The control method for a portable read-write pen according to claim 1, characterized in that, the control method for a portable read-write pen further comprises: detecting a motion state of the portable read-write pen; and controlling, according to the motion state of the portable read-write pen, the portable read-write pen to enable the touch-read mode or the write-record mode.

15. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 14.

16. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 14.

17. A portable read-write pen, characterized in that, the portable read-write pen has a touch-read mode and a write-record mode, and the portable read-write pen comprises: a memory, a processor and a computer program that is stored on the memory and can be run on the processor, wherein the computer program, when executed by the processor, implements steps of a control method for the portable read-write pen according to claim 1.

18. The portable read-write pen according to claim 17, characterized in that the pen point of the portable read-write pen is configured to be in an ink discharging state when a pressure on the pen point is greater than a pre-set pressure threshold.

19. A portable read-write pen, characterized in that, the portable read-write pen has a touch-read mode and a write-record mode; and the portable read-write pen comprises: a memory, a processor and a computer program that is stored on the memory and can be run on the processor, and the portable read-write pen further comprises a pen cap which is detachably connected with a pen head of the portable read-write pen to cover a pen point, wherein when the pen cap covers the pen point, the portable read-write pen enables the touch-read mode; and when the pen cap is separated from the pen head, the computer program is executed by the processor to implement steps of a control method for the portable read-write pen according to claim 1.

20. The portable read-write pen according to claim 19, characterized in that the pen point of the portable read-write pen is configured to be in an ink discharging state when a pressure on the pen point is greater than a pre-set pressure threshold.

* * * * *